(12) United States Patent
Uchida et al.

(10) Patent No.: US 6,207,746 B1
(45) Date of Patent: Mar. 27, 2001

(54) PROCESS FOR PRODUCTION OF THERMOPLASTIC POLYMER COMPOSITION

(75) Inventors: Kensuke Uchida; Shinichi Shibayama, both of Kawasaki (JP)

(73) Assignee: Asahi Kasei Kogyo Kabushiki Kaisha, Osaka (JP)

(*) Notice: Subject to any disclaimer, the term of this patent is extended or adjusted under 35 U.S.C. 154(b) by 0 days.

(21) Appl. No.: 09/285,657

(22) Filed: Apr. 5, 1999

(51) Int. Cl.$^7$ ..................................................... C08L 23/00
(52) U.S. Cl. ................................................................ 524/528
(58) Field of Search ............................................... 524/528

(56) References Cited

U.S. PATENT DOCUMENTS

| | | | | |
|---|---|---|---|---|
| 4,454,092 | * | 6/1984 | Shimizu | 264/349 |
| 5,187,224 | * | 2/1993 | Hamanaka | 524/505 |
| 5,264,476 | * | 11/1993 | Daimon | 524/271 |

* cited by examiner

*Primary Examiner*—Paul R. Michl
(74) *Attorney, Agent, or Firm*—Birch, Stewart, Kolasch & Birch, LLP

(57) ABSTRACT

A process for producing a thermoplastic polymer composition comprising:

(1) 100 parts by weight of an olefin polymer which comprises ethylene and at least one α-olefin having 3 to 10 carbon atoms and in which the density is in the range of 0.85 to 0.91 g/cm$^3$ and the molecular weight distribution (Mw/Mn) which is the ratio of weight average molecular weight (Mw) and number average molecular weight (Mn) as calculated by a gel permeation chromatography (GPC) is less than 3.5, (2) 5 to 300 parts by weight of a propylene polymer, (3) 5 to 250 parts by weight of an oil, and (4) 0.02 to 3 parts by weight of a radical initiator, which process comprises steps of previously mixing and heat-kneading the olefin polymer, the propylene polymer and the radical initiator; adding the oil in the stage in which cross-linking is at a proportion of 30 to 95% based on the cross-linking degree of the composition to be finally obtained; and further melt-kneading them to cross-link the same.

11 Claims, No Drawings

PROCESS FOR PRODUCTION OF THERMOPLASTIC POLYMER COMPOSITION

BACKGROUND OF THE INVENTION (1) Field of the Invention

This invention relates to a process for producing a thermoplastic polymer composition comprising a specific olefin polymer.

(2) Description of Related Art

As a cross-linking rubber component for a thermoplastic olefin elastomer, there has heretofore been generally used an ethylene-propylene-diene rubber (EPDM). The diene component in the polymer chain of EPDM is necessary for enhancing the cross-linkability; however, the environmental deterioration resistance becomes insufficient owing to the presence of the above diene component, and an improvement in quality has been desired.

On the other hand, even in the case of an ethylene-propylene rubber (EPR) which does not contain the diene component, it is possible to cross-link the same with a radical initiator such as an organic peroxide or the like; a polyfunctional unsaturated compound; or the like. However, since EPDM and EPR which have been used in the conventional thermoplastic olefin elastomers as mentioned above are produced using a so-called "multisite catalyst" of the Ziegler type, many polymerizing active sites are present therein, the molecular weight distribution is broad, the ultra low molecular weight component is contained in a considerable amount, and hence, the balance between their own flexibility and mechanical strength is inferior.

Moreover, as to the Ziegler type EPR and EPDM, the polymer structure which can form pellets is limited and EPRs or EPDMs having the other structures are in the veil form and are complicated in handling, and hence, are not desirable. In addition, even EPR and EPDM which form pellets have a problem of blocking due to the ultra low molecular weight component, and hence, they are not desirable, either.

The present inventors have already presented, in JP-A-9-104,787, a thermoplastic composition prepared by cross-linking, with a radical initiator, a composition containing an olefin polymer produced using a metallocene type catalyst; however, it has been one which still leaves room for improvement in physical properties.

Furthermore, WO96/35,751 discloses a process for producing a vulcanized, thermoplastic, elastic composition by kneading, in the presence of a cross-linking agent, a composition containing an elastic ethylene copolymer produced using a metallocene type catalyst. However, the composition obtained still leaves room for improvement in physical properties.

SUMMARY OF THE INVENTION

An object of this invention is to improve the environmental deterioration resistance which has been a problem of conventional olefin elastomers and provide a process for producing a thermoplastic polymer composition excellent in mechanical characteristics and thermal resistance and the like.

The present inventors have earnestly repeated examination in view of the above-mentioned points, and as a result, have found that all the above-mentioned problems are solved by the process for producing a thermoplastic polymer composition stated below and have accomplished this invention.

That is to say, this invention is a process for producing a thermoplastic polymer composition comprising:

(1) 100 parts by weight of an olefin polymer which comprises ethylene and at least one α-olefin having 3 to 10 carbon atoms and in which the density is in the range of 0.85 to 0.91 g/cm$^3$ and the molecular weight distribution (Mw/Mn) which is a ratio of weight average molecular weight (Mw) and number average molecular weight (Mn) as calculated by a gel permeation chromatography (GPC) is less than 3.0, (2) 5 to 300 parts by weight of a propylene polymer, (3) 5 to 250 parts by weight of an oil, and (4) 0.02 to 3 parts by weight of a radical initiator, which process comprises steps of previously mixing and heat-kneading the olefin polymer, the propylene polymer and the radical initiator; adding the oil in such a stage that cross-linking is in a proportion of 30 to 95% based on the cross-linking degree of the composition to be finally obtained; and further melt-kneading them to cross-link the same.

The process for producing a thermoplastic composition of this invention makes it possible to obtain a composition superior in thermal resistance such as compression set or the like and physical properties such as environmental deterioration resistance and the like as compared with the composition in which the conventional EPDM or the like is used, and its utilization value is very great.

The thermoplastic composition obtained by the process of this invention can be widely employed in uses including automobile parts, interior automotive trim materials, air bag covers, mechanical parts, electric parts, cables, horses, belts, toys, miscellaneous goods, daily necessaries, construction materials, sheets, films and the like.

PREFERRED EMBODIMENTS OF THE INVENTION

This invention is described below in detail.

Olefin polymer

The olefin polymer which is the main component constituting the thermoplastic polymer composition of this invention is a copolymer comprising ethylene and at least one α-olefin having 3 to 10 carbon atoms, and has a specific density and a specific molecular weight distribution.

As the olefin having 3 to 10 carbon atoms, there are mentioned, for example, propylene, butene-1, pentene-1, hexene-1, 4-methylpentene-1, heptene-1, octene-1, nonene-1,1 decene-1 and the like. In particular, a copolymer consisting of ethylene and an a-olefin having 6 to 10 carbon atoms is preferable because it is excellent in balance between mechanical strength and radical cross-linkability.

The olefin polymer used in this invention can be produced with a known single site catalyst which has heretofore been used, particularly a metallocene type catalyst.

The metallocene type catalyst is a polymerization catalyst composed of a metallocene compound alone or a combination of a metallocene compound with a promotor. The metallocene compound is one having such a structure that a transition metal such as titanium, zirconium, hafnium or the like is coordinated with at least one unsaturated cyclic compound, and as the unsaturated cyclic compound, there are mainly used cyclopentadienyl derivatives having cyclopentadiene, indene or the like as a molecular skeleton. Moreover, as the promotor, there are used organoaluminum compounds such as alkyl aluminoxanes, alkylaluminum halides and the like; organoboron compounds; and the like.

The metallocene type catalyst is highly active as a polymerization catalyst, and in addition, characterized in that as compared with the conventional catalysts, for example, Ziegler catalysts, the molecular weight distribution of the polymer obtained is narrow and the distribution of an α-olefin having 3 to 10 carbon atoms which is the comonomer in the copolymer is uniform, and the catalyst species is uniform.

The olefin polymer used in this invention is one produced using a polymerization catalyst different from the conventional Ziegler catalyst and the like, and the properties thereof are greatly different as compared with the conventional Ziegler type polymers.

The characteristic features of the olefin polymers produced using a metallocene type polymerization catalyst are listed as follows:

1. since the polymerization catalyst has an ultrahigh activity, it becomes possible to greatly heighten the composition of a-olefin, which is a comonomer, as compared with the conventional one, and an elastomeric polymer rich in flexibility is obtained even in the state that no plasticizer is contained;
2. the comonomer distribution is uniform as compared with the Ziegler type polymers;
3. the molecular weight distribution is extremely sharp as compared with the Ziegler type polymers, and the amount of the low molecular weight component is very small, the mechanical strength and processability are excellent, and the polymer has a high quality as compared with the Ziegler type polymers;
4. when a long chain branch is introduced, in spite of the molecular weight distribution being sharp, the value of ratio ($I_{10}/I_2$) of the melt index at 190° C./10 kgf ($I_{10}$) to the melt index at 190° C./2.16 kgf ($I_2$) as defined according to ASTM D1238 is large, and the processing characteristics are excellent;
5. the weather resistance is very much excellent; etc.

In the olefin polymer which is a copolymer of ethylene with an α-olefin produced using a Ziegler catalyst, the above-mentioned melt index ratio ($I_{10}/I_2$) and the molecular weight distribution show a substantially linear, proportional relation and such a tendency is shown that the molecular weight distribution increases with an increase of the melt index ratio. The molecular weight distribution is about 3 to 10.

On the other hand, in the case of the olefin polymer produced using a metallocene type catalyst, the molecular weight distribution becomes a sharp value of less than 3.0 regardless of the value of melt index ratio and the amount of the low molecular weight component is very small. Therefore, the mechanical strength and processability of the olefin polymer constituting the thermoplastic polymer composition of this invention are excellent.

The molecular weight distributions of these olefin polymers are calculated by GPC. The GPC apparatus and the measurement method are not particularly limited; however, the present inventors have used the following apparatus and measurement method.

1. Apparatus: 150C. GPC manufactured by Waters.
2. Column:
   SHODEX AT-807S, 1 column,
   TOSOH TSK-GEL GMH-H6, 2 columns,
   3 columns in total.
3. Solvent: 1,2,4-Trichlorobenzene.
4. Measurement temperature: 140° C.
5. Standard material: Polystyrene.

The olefin polymer used in this invention is preferably such that the density is in the range of 0.85 to 0.91 g/cm³.

By using an olefin polymer having a density in this range, a thermoplastic polymer composition excellent in flexibility and also excellent in mechanical strength and the like can be obtained.

Moreover, the melt index of the olefin polymer used in this invention is not particularly limited; however, it is preferably in the range of 0.01 to 100 g/10 min (190° C., 2.16 kg load), more preferably in the range of 0.05 to 50 g/10 min.

In this invention, the olefin polymer may be used in admixture of plural kinds, whereby it is made possible to intend to enhance the processability.

As the olefin polymer comprising ethylene and at least one α-olefin having 3 to 10 carbon atoms produced with the metallocene type catalyst, known are commercial products such as ENGAGE® of DU PONT DOW ELASTOMER COMPANY, AFFINITY® of THE DOW CHEMICAL COMPANY, EXACT® of EXXON CORPORATION and the like.

Propylene polymer

As the propylene polymer used in this invention, there are specifically mentioned isotactic polypropylene; isotactic copolymers of propylene with another α-olefin such as ethylene, butene-1, pentene-1, hexene-1 or the like (including block copolymers and random copolymers); and the like.

The melt index of the propylene polymer is not particularly limited; however, it is preferably in the range of 0.1 to 100 g/10 min (230° C., 2.16 kg load), more preferably in the range of 0.5 to 50 g/10 min.

At least one polymer selected from these polymers is used in a composition ratio of 5 to 300 parts by weight, preferably 5 to 100 parts by weight, per 100 parts by weight of the olefin polymer. When it exceeds 300 parts by weight, the flexibility of the composition is insufficient, and when it is less than 5 parts by weight, the flow properties and processability of the composition are deteriorated, which is not desirable.

Oil

As the oil used in this invention, preferable are process oils such as paraffinic oils, naphthenic oils, aromatic oils and the like. These are used in an amount of 5 to 250 parts by weight for the adjustment of the hardness and flexibility of the composition. When it is less than 5 parts by weight, the flexibility and processability are lacking and when it exceeds 250 parts by weight, the bleeding of the oil becomes remarkable, which is not desirable.

The thermoplastic polymer composition provided in this invention requires combining the previously explained specific olefin polymer, propylene polymer and oil in the specific composition ratios, whereby it becomes possible to obtain a composition improved in mechanical strength and in balance between flexibility and processability.

The thermoplastic polymer composition provided in this invention is required to be partially cross-linked with a radical initiator such as an organic peroxide or the like and a cross-linking coagent. It is thereby made possible to further enhance abrasion resistance, mechanical strength, thermal resistance and the like.

Here, as specific examples of the radical initiator which are preferably used, there can be mentioned peroxyketals such as 1,1-bis(t-butylperoxy)-3,3,5-trimethylcyclohexane, 1,1-bis(t-butylperoxy)cyclohexane, 2,2-bis(t-butylperoxy) octane, n-butyl-4,4-bis(t-butylperoxy)butane, n-butyl-4,4-bis(t-butylperoxy)valerate and the like; dialkyl peroxides such as di-t-butyl peroxide, dicumyl peroxide, t-butylcumyl peroxide, αα'-bis(t-butylperoxy-m-isopropyl)benzene, α, α'-bis(t-butylperoxy)diisopropylbenzene, 2,5-dimethyl-2,5-bis(t-butylperoxy)hexane, 2,5-dimethyl-2,5-bis(t-butylperoxy)-hexene-3 and the like; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-toluoyl peroxide and the like; peroxy esters such as t-butyl peroxyacetate, t-butyl peroxyisobutyrate, t-butyl peroxy-2-ethylhexanoate, t-butyl peroxylaurate, t-butyl peroxybenzoate, di-t-butyl peroxyisophthalate, 2,5-dimethyl-2,5-di(benzoylperoxy)hexane, t-butylperoxymaleic acid, t-butyl peroxyisopropylcarbonate, cumyl peroxyoctoate and the like; and hydroperoxides such as t-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide and the like.

Among these compounds, preferable are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexene-3.

These radical initiators are used in an amount of 0.02 to 3 parts by weight, preferably 0.05 to 1 part by weight, per 100 parts by weight of the olefin polymer. When it is less than 0.02 part by weight, the cross-linking is insufficient and even when it exceeds 3 parts by weight the physical properties of the composition are not enhanced, which is not desirable.

Moreover, by using the cross-linking coagent together with the radical initiator, the cross-linking efficiency is increased, whereby it becomes possible to obtain a composition having better performance. As the cross-linking coagent, there can be mentioned divinylbenzene, triallyl isocyanurate, triallyl cyanurate, diacetonediacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenyl-maleimide, allyl methacrylate, N,N'-m-phenylene-bismaleimide, diallyl phthalate, tetraallyloxyethane, 1,2-polybutadiene and the like. Among them, divinylbenzene and triallyl isocyanurate are particularly excellent in cross-linking efficiency and preferably used. These cross-linking coagents may be used in combination of several kinds of cross-linking coagents.

These cross-linking coagents are used in an amount of 0.1 to 5 parts by weight, preferably 0.5 to 2 parts by weight, per 100 parts by weight of the olefin polymer. When it is less than 0.1 part by weight, the cross-linking is insufficient and even when it exceeds 5 parts by weight, the physical properties of the composition are not enhanced and the excess cross-linking coagent remains, which is not desirable.

Furthermore, to the thermoplastic composition of this invention may be added other resins and elastomers to such an extent that the characteristics thereof are not impaired. Examples thereof include polyethylene, polybutene, aromatic vinyl compound-conjugated diene compound block copolymers, hydrogenated products of aromatic vinyl compound-conjugated diene compound block copolymers and the like.

In addition, the thermoplastic composition of this invention can contain inorganic fillers and plasticizers to such an extent that the characteristics thereof are not impaired. As the inorganic fillers used here, there are mentioned, for example, calcium carbonate, magnesium carbonate, silica, talc, carbon black, glass fiber, titanium oxide, clay and the like. Moreover, as the plasticizer, there are mentioned, for example, polyethylene glycol; phthalic acid esters such as dioctyl phthalate (DOP) and the like; etc. Also, other additives, for example, organic-inorganic pigments, thermal stabilizers, antioxidants, ultraviolet absorbers, light stabilizers, silicone oils, antibacterial agents, antistatic agents, flame retardants and the like can be suitably used.

The thermoplastic composition of this invention, when subjected to a specific processing step, develops its physical characteristics.

That is to say, the olefin polymer is first mixed with the radical initiator and the cross-linking coagent to attach the radical initiator and the cross-linking coagent to the surface of the olefin polymer. The mixture obtained is subsequently well mixed with the propylene polymer. When the mixture is heat-melted and kneaded at 160–300° C., the above polymer is reacted with the radical initiator and the cross-linking coagent, and partially cross-linked, after which the oil is added in the middle of the reaction. The mixture is further melt-kneaded, thereby sufficiently conducting cross-linking reaction and dispersive kneading, and thereafter pelletized, whereby pellets of the thermoplastic polymer composition can be obtained.

The forms of the olefin polymer and the propylene polymer are preferably finely divided forms such as pellet, powder, crumb and the like.

In the mechanical heat-melt-kneading of the thermoplastic polymer composition, a general means can be adopted such as single screw extruder, twin screw extruder, Banbury mixer, pressure kneader, mixing roll or the like which are used in the production of a conventional resin composition or elastomer composition.

However, among them, twin screw extruder is preferably used. The twin screw extruder is more suitable for continuously producing the thermoplastic composition by uniformly and finely dispersing the olefin polymer and the propylene polymer in the presence of the radical initiator and the cross-linking coagent, further causing cross-linking reaction and further adding the oil in the middle of the step.

The screw construction of the extruder is desirably of such a type that the first kneading zone is present between the oil-addition position and the hopper and the second and subsequent kneading zones are present after the oil-addition position.

When an extruder is used, the addition of the oil is preferably the pouring from the pouring port provided in the extruder cylinder using a gear pump or the like.

Moreover, a part of the olefin polymer, the propylene polymer and other resins and elastomers may be additionally added from a position on the die side of the oil-addition position by a side feeder or the like.

It is also desirable to add the radical initiator and the cross-linking coagent in the state that they are attached to the olefin polymer surface. In a method in which the radical initiator or the whole of the radical initiator and the cross-linking coagent is added in the middle of the extruder, the cross-linking reaction does not proceed effectively and these agents evaporate away or are consumed by side reactions such as decomposition reaction of the propylene polymer and the like, whereby it becomes difficult to obtain a composition having good physical properties. However, when a substantial part of the radical initiator or a substantial part of the radical initiator and cross-linking coagent is mixed beforehand, a part thereof may be added in the middle of the extruder.

As a measure for the cross-linkability of the composition, the cross-linking degree is defined in the following equation (1):

$$\text{Cross-linking degree} = \frac{\text{Weight of residue (g)}}{\substack{\text{Weight of olefin polymer} \\ \text{in the composition (g)}}} \times 100$$

wherein when the composition contains components insoluble in trichlorobenzene, for example, such components as inorganic filler, inorganic pigment, metal and the like, the value obtained by subtracting the weight corresponding to the trichlorobenzene-insoluble components from the weight of the residue on a filter is used as the weight of residue.

It is desirable that the final cross-linking degree of the thermoplastic polymer composition of this invention is at least 30%, preferably at least 50%, and more preferably at least 65%. When it is less than 30%, the cross-linking is insufficient, so that thermal resistance such as compression set or the like, and physical properties such as impact resilience and the like are deteriorated.

The cross-linking degree of the composition just before the midway addition of the oil is measured as follows. That is, the revolution of the screw is stopped in the course of processing the composition, the lid of the cylinder block provided with the oil-pouring port is quickly opened and a sample of the composition just before the addition of the oil is taken out. The cross-linking degree of this composition sample is calculated according to the above equation (1).

Moreover, the proportion of the cross-linking degree of the composition just before the midway addition of the oil to the cross-linking degree of the finally obtained composition is 30 to 95%, preferably 40 to 95% and more preferably 50 to 95%. When it is less than 30%, the final cross-linking degree cannot be sufficiently heightened and physical properties, for example, thermal resistance such as compression set or the like are deteriorated. Furthermore, when it exceeds 95%, absorptive dispersion of the oil becomes not easy and such a bad effect as oil-bleeding or the like tends to be caused.

By beforehand cross-linking the composition in an adequate range before the addition of the oil, the radical initiator and the cross-linking coagent are effectively used for the cross-linking without being diluted, and after the addition of the oil, they absorb the oil and the cross-linking further proceeds in the state that they retain the oil, so that it is considered that a composition be obtained which has such a structure that the network of cross-linkages in the olefin polymer and the absorptive dispersion state of oil are adequately balanced and which has excellent physical properties.

The cross-linking degree is appropriately adjusted by temperature and reaction time in heat-kneading the composition.

As to the olefin polymer of this invention, when it has been produced with a metallocene type catalyst, the distribution of comonomer is uniform as mentioned above, so that the cross-linking sites are considered to become uniform as compared with the EPDM produced with the Ziegler catalyst. Therefore, according to the production process of this invention in which the oil is added when the cross-linking degree is in the specified range, the cross-linking sites become uniform, whereby a polymer composition having better physical properties such as mechanical properties, compression set and the like is obtained.

The thermoplastic composition thus obtained can be formed into various molded articles by any molding method. Injection molding, extrusion molding, compression molding, blow molding, calender molding, expansion molding and the like are preferably used.

This invention is explained below in more detail by Examples; however, this invention should not be construed to be limited to the Examples. Incidentally, in these Examples and Comparative Examples, the test methods used for evaluation of various physical properties are as follows.

(1) MFR [g/10 min]

Evaluated according to JIS K7210 at 230° C. under a load of 2.16 kgf.

(2) Hardness

Evaluated according to ASTM D2240, Type A using four 2-mm thick sheets piled one on another in an atmosphere at 23° C.

(3) Tensile strength at break [kgf/cm$^2$]

Evaluated according to JIS K6251 at 23° C.

(4) Tensile elongation at break [%]

Evaluated according to JIS K6251 at 23° C.

(5) Compression set (C-Set) [%]

Evaluated according to JIS K6301 under the conditions of 70° C.×22 hours.

(6) Environmental deterioration resistance retention

Tensile strength retention [%] was measured after a compression molded sheet having a thickness of 2 mm was continuously exposed for 150 hours according to ASTM D1499 using a carbon arc type sunshine weatherometer (manufactured by Suga Tester) at a black panel temperature of 63° C. for a shower time of 18 min/exposure time of 120 min.

(7) Oil-bleeding

A sheet having a thickness of 2 mm prepared by compression molding at a molding temperature of 200° C. was allowed to stand for one week at an ambient temperature of 23° C. and the state of the oil bled-out to the surface was evaluated visually based on the following criterion:

o: No oil bled, Δ: Oil bled slightly, X: Oil bled clearly.

Furthermore, in the preparation of the thermoplastic compositions of the Examples and the Comparative Examples, the present inventors used the following materials:

Component (a-1), olefin polymer
- ENGAGE 8150 manufactured by DU PONT DOW ELASTOMER COMPANY.
- Comonomer: Octene-1.
- Density: 0.868 g/cm$^3$.
- Mw/Mn=2.3.
- ASTM D1238 melt index 0.5.
- ASTM D2240 hardness (Type A) 75

Component (a-2), olefin polymer
- ENGAGE 8200 manufactured by DU PONT DOW ELASTOMER COMPANY.
- Comonomer: Octene-1.
- Density: 0.870 g/cm$^3$.
- Mw/Mn=2.4.
- ASTM D1238 melt index 5.
- ASTM D2240 hardness (Type A) 75.

Component (b), ethylene-propylene-diene rubber (EPDM)
- Obtained by polymerization with Ziegler type multisite catalyst.
- C3 content: 27% by weight.
- Diene component: Ethylidenenorbornene.
- Diene content: 4 mol %
- Mw/Mn=3.8.
- ASTM D1238 melt index 2.

ASTM D2240 hardness (Type A) 73.
Component (c), propylene polymer
  Isotactic polypropylene resin manufactured by Mitsubishi Chemical Corp.
  Mitsubishi Polypro MA2
  ASTM D1238 melt index 16.
Component (d), paraffinic oil.
  Diana Process Oil PW-380 manufactured by Idemitsu Kosan K. K.
Component (e), radical initiator
  2,5-Dimethyl-2,5-bis(t-butylperoxy)hexane
  Perhexa 25B manufactured by NOF CORP.
Component (f-1), cross-linking coagent
  Divinylbenzene
Component (f-2), cross-linking coagent
  Triallyl isocyanurate

EXAMPLES 1 TO 8 AND COMPARATIVE EXAMPLES 1 to 6

As an extruder, a twin screw extruder was used in which the screws rotated in the same direction and which had an oil-pouring port in the middle of cylinder (40 mmφ, L/D=45, number of cylinder blocks =13). The cylinder blocks were numbered as No. 1 to No. 13 from the hopper side. The oil-pouring port was placed in cylinder block No. 7. As the screw, a twin screw was used which had kneading portions by kneading disks before and after the oil-pouring port.

As shown in Table 1, the radical initiator and the cross-linking coagent were added in the specified amounts to the olefin polymer pellets to attach them to the pellet surfaces. Subsequently, the propylene polymer pellets were added and the resulting mixture was well blended and then introduced into the hopper of the twin screw extruder. From the oil-pouring port in the middle of the extruder, the specified amount of the oil was poured by a gear pump and the resulting mixture was heat-kneaded and then pelletized to obtain composition pellets. From the composition obtained, sheets each having a thickness of 2 mm were prepared by compression molding at 200° C. and subjected to evaluation of mechanical characteristics and environmental deterioration resistance of each.

As Comparative Examples 1 and 4, the results obtained by introducing, from the hopper, the oil attached to and absorbed by the pellets together with the other components without adding the oil from the oil-pouring port in the middle of the extruder were evaluated at the same time.

The results are shown in Table 1.

TABLE 1

| | | | Example | | | | | | | | |
|---|---|---|---|---|---|---|---|---|---|---|---|
| | | Unit | 1 | 2 | 3 | 4 | 5 | 6 | 7 | 8 |
| Production process | Oil-addition point | | Mid-way | Mid-way | Mid-way | Mid-way | Mid-way | Mid-way | Mid-way | Mid-way |
| | Proportion of cross-linking degree in oil addition to final cross-linking degree | % | 87 | 90 | 40 | 55 | 83 | 87 | 79 | 80 |
| Composition ratio | Component (a-1) | Part by weight | 100 | 100 | 100 | 100 | 100 | 100 | 100 | — |
| | Component (a-2) | Part by weight | — | — | — | — | — | — | — | 100 |
| | Component (b) | Part by weight | — | — | — | — | — | — | — | — |
| | Component (c) | Part by weight | 30 | 30 | 50 | 50 | 50 | 50 | 80 | 30 |
| | Component (d) | Part by weight | 60 | 60 | 55 | 55 | 55 | 55 | 60 | 60 |
| | Component (e) | Part by weight | 0.6 | 0.6 | 0.6 | 0.6 | 0.6 | 0.6 | 0.6 | 0.6 |
| | Component (f-1) | Part by weight | 1.2 | — | 1.2 | 1.2 | 1.2 | — | 1.2 | 1.2 |
| | Component (f-2) | Part by weight | — | 0.6 | — | — | — | 0.6 | — | — |
| Physical properties | MFR | g/10 min | 0.8 | 0.3 | 1.8 | 1.5 | 1.4 | 0.6 | 2.8 | 0.9 |
| | Hardness | | 69 | 70 | 79 | 80 | 80 | 81 | 90 | 69 |
| | Tensile strenght at break | kgf/cm$^2$ | 79 | 70 | 77 | 83 | 91 | 82 | 103 | 76 |
| | Tensile elongation at break | % | 400 | 340 | 430 | 430 | 440 | 350 | 460 | 410 |
| | Compression set | % | 35 | 28 | 53 | 47 | 38 | 34 | 48 | 36 |
| | Final cross-linking degree | % | 79 | 91 | 68 | 74 | 78 | 87 | 72 | 76 |
| | Environmental degradation resistance retention | % | 95 | 91 | 95 | 96 | 96 | 92 | 97 | 94 |
| | Oil-bleeding | % | ◯ | ◯ | ◯ | ◯ | ◯ | ◯ | ◯ | ◯ |

| | | | Comparative Example | | | | | |
|---|---|---|---|---|---|---|---|---|
| | | Unit | 1 | 2 | 3 | 4 | 5 | 6 |
| Production process | Oil-addition point | | Beginning | Mid-way | Beginning | Beginning | Mid-way | Mid-way |

TABLE 1-continued

|  |  |  |  |  |  |  |  |  |
|---|---|---|---|---|---|---|---|---|
|  | Proportion of cross-linking degree in oil addition to final cross-linking degree | % | 0 | 23 | 0 | 0 | 22 | 99 |
| Composition ratio | Component (a-1) | Part by weight | — | — | 100 | 100 | 100 | 100 |
|  | Component (a-2) | Part by weight | — | — | — | — | — | — |
|  | Component (b) | Part by weight | 100 | 100 | — | — | — | — |
|  | Component (c) | Part by weight | 50 | 50 | 50 | 50 | 50 | 50 |
|  | Component (d) | Part by weight | 55 | 55 | 55 | 55 | 55 | 55 |
|  | Component (e) | Part by weight | 0.6 | 0.6 | — | 0.6 | 0.6 | 0.6 |
|  | Component (f-1) | Part by weight | 1.2 | 1.2 | — | 1.2 | 1.2 | 1.2 |
|  | Component (f-2) | Part by weight | — | — | — | — | — | — |
| Physical properties | MFR | g/10 min | 2.6 | 2.0 | 29 | 3.3 | 2.4 | 1.9 |
|  | Hardness |  | 77 | 78 | 73 | 78 | 78 | 81 |
|  | Tensile strength at break | kgf/cm$^2$ | 67 | 72 | 89 | 60 | 70 | 90 |
|  | Tensile elongation at break | % | 420 | 430 | 980 | 400 | 420 | 410 |
|  | Compression set | % | 54 | 53 | 99 | 60 | 57 | 51 |
|  | Final cross-linking degree | % | 55 | 68 | 0 | 43 | 58 | 81 |
|  | Environmental degradation resistance retention | % | 76 | 79 | —*) | 91 | 95 | 89 |
|  | Oil-bleeding | % | ○ | ○ | ○ | ○ | ○ | x |

*)Since sample was changed in shape, measurement was impossible.

As is clear from the above results, the thermoplastic composition provided by this invention had excellent mechanical characteristics, compression set and environmental deterioration resistance.

Comparative Examples 1 and 2 are compositions in which EPDM is used and are clearly inferior in environmental deterioration resistance.

In Comparative Example 3, no cross-linking agent was used, so that the compression set and environmental deterioration resistance were inferior.

In Comparative Examples 4 and 5, the cross-linking reaction did not proceed effectively, and as compared with Examples 3 to 5 having the same composition, the mechanical strength and compression set were consequently low.

In Comparative Example 6, the oil was added after substantial completion of the cross-linking reaction; however, the absorptive dispersion of the oil was insufficient, and oil-bleeding was observed.

What is claimed is:

1. A process for producing a thermoplastic polymer composition comprising:
   (1) 100 parts by weight of an olefin polymer which comprises ethylene and at least one α-olefin having 3 to 10 carbon atoms and in which the density is in the range of 0.85 to 0.91 g/cm$^3$ and the molecular weight distribution (Mw/Mn) which is the ratio of weight average molecular weight (Mw) and number average molecular weight (Mn) as calculated by a gel permeation chromatography (GPC) is less than 3.5,
   (2) 5 to 300 parts by weight of a propylene polymer,
   (3) 5 to 250 parts by weight of an oil, and
   (4) 0.02 to 3 parts by weight of a radical initiator, which process comprises steps of previously mixing and heat-kneading the olefin polymer, the propylene polymer and the radical initiator; adding the oil in the stage in which cross-linking is at a proportion of 30 to 95% based on the cross-linking degree of the composition to be finally obtained; and further melt-kneading them to cross-link the same.

2. The process according to claim 1, wherein the oil is added in the stage that cross-linking is at a proportion of 50 to 95% based on the cross-linking degree of the composition to be finally obtained and the mixture is further melt-kneaded to be cross-linked.

3. The process according to claim 1, wherein the olefin polymer is one produced with a metallocene type catalyst.

4. The process according to any one of claims 1 to 3, wherein the cross-linking degree of the finally obtained composition is at least 30%.

5. The process according to claim 1, wherein the olefin is selected from the group consisting of propylene, butene-1, pentene-1, hexene-1, 4-methylpentene-1, heptene-1, octene-1, nonene-1, and decene-1.

6. The process according to claim 3, wherein the metallocene has a transition metal selected the group consisting of titanium, zirconium, and hafnium, and the transition metal is coordinated with at least one unsaturated cyclic compound.

7. The process according to claim 1, wherein the olefin polymer has a melt index of 0.01 to 100 g/10 min (190° C., 2.16 kg load).

8. The process according to claim 1, wherein the thermoplastic polymer composition comprises 5 to 100 parts by weight of a propylene polymer.

9. The process according to claim 1, wherein the oil is a paraffinic oil, naphthenic oil, or aromatic oil.

10. The process according to claim 1, wherein the radical initiator is selected from the group consisting of 1,1-bis(t-butylperoxy)-3,3,5-trimethylcyclohexane, di-t-butylperoxide, dicumyl peroxide, 2,5-dimethyl-2,5-bis(t-butylperoxy)hexane and 2,5-dimethyl-2,5-bis(t-butylperoxy)hexene-3.

11. The process according to claim 1, wherein a cross-linking coagent is used with the radical initiator and the cross-linking coagent is used in an amount of 0.1 to 5 parts by weight per 100 parts by weight of the olefin polymer.

* * * * *